United States Patent
Van De Nieuwelaar et al.

(10) Patent No.: US 11,191,280 B2
(45) Date of Patent: Dec. 7, 2021

(54) METHOD FOR MANUFACTURING SAUSAGE PRODUCTS USING LIQUID HEATING

(71) Applicant: MAREL FURTHER PROCESSING B.V., Boxmeer (NL)

(72) Inventors: Adrianus Josephes Van De Nieuwelaar, Gemert (NL); Marcus Bernhard Hubert Bontjer, Aarle Rixtel (NL); Martinus Wilhelmus Johannus Kuijpers, Oploo (NL); Frederik Franciscus Leondardus Ankersmit, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 0 days.

(21) Appl. No.: 16/027,807

(22) Filed: Jul. 5, 2018

(65) Prior Publication Data

US 2018/0310573 A1 Nov. 1, 2018

Related U.S. Application Data

(60) Continuation of application No. 14/513,434, filed on Oct. 14, 2014, now abandoned, which is a division of application No. 12/991,099, filed as application No. PCT/NL2009/050292 on May 26, 2009, now abandoned.

(30) Foreign Application Priority Data

May 26, 2008 (NL) .................................. 200619

(51) Int. Cl.
*A22C 13/00* (2006.01)
*A22C 11/00* (2006.01)
*A23L 13/60* (2016.01)

(52) U.S. Cl.
CPC .......... *A22C 13/0016* (2013.01); *A22C 11/00* (2013.01); *A23L 13/65* (2016.08); *A22C 2013/005* (2013.01); *A22C 2013/0023* (2013.01)

(58) Field of Classification Search
CPC ..... A22C 11/00; A22C 11/006; A22C 11/008; A22C 11/029; A22C 13/0003
USPC ........................................................ 426/277
See application file for complete search history.

(56) References Cited

U.S. PATENT DOCUMENTS

| | | |
|---|---|---|
| 8,703,221 B2 | 4/2014 | Bontjer et al. |
| 2007/0031542 A1 | 2/2007 | Chu et al. |
| 2008/0220130 A1 | 9/2008 | Bontjer et al. |

FOREIGN PATENT DOCUMENTS

| | | | | |
|---|---|---|---|---|
| DE | 2228564 A1 | 1/1974 | | |
| DE | 10106553 A1 | 9/2002 | | |
| DE | 102011010267 A1 | * 7/2012 | ............ | A23L 13/43 |
| EP | 1834525 A1 | 9/2007 | | |
| NL | 1029272 C2 | 12/2006 | | |
| WO | 9528090 A1 | 10/1995 | | |
| WO | 0044233 A1 | 8/2000 | | |
| WO | 2006135238 A2 | 12/2006 | | |
| WO | 2007032678 A1 | 3/2007 | | |

* cited by examiner

*Primary Examiner* — Vera Stulii
(74) *Attorney, Agent, or Firm* — Workman Nydegger

(57) ABSTRACT

The present invention relates to a method for manufacturing sausage products by means of co-extrusion, wherein the method comprises the following steps of: A) providing a food dough; B) providing a viscous paste; C) producing by means of co-extrusion a sausage strand with a core of the food dough enclosed by a casing of the paste; D) subdividing the sausage strand into sausage products; and E) guiding the sausage through a fixing bath, whereby the cohesion of the sausage increases.

18 Claims, 2 Drawing Sheets

METHOD FOR MANUFACTURING SAUSAGE PRODUCTS USING LIQUID HEATING

This application is a continuation of U.S. patent application Ser. No. 14/513,434 filed Oct. 14, 2014, which is a divisional of U.S. patent application Ser. No. 12/991,099 filed Jan. 28, 2011, which is based on PCT/NL2009/050292 filed May 26, 2009, which claimed priority of NL 2001619 filed May 26, 2008.

BACKGROUND OF THE INVENTION

The present invention relates to a method for manufacturing sausage products by means of co-extrusion, wherein the method comprises the following steps of: A) providing a food dough; B) providing a viscous paste; C) producing by means of co-extrusion a sausage strand with a core of food dough enclosed by a casing of the paste; D) subdividing the sausage strand into sausage products; and E) guiding the sausage strand through a fixing bath, whereby the cohesion of the sausage increases.

Such a method is known from, among others, NL 1029272 and has the drawback that the sausage strand is very vulnerable shortly after the co-extrusion of the sausage strand, whereby it can easily deform permanently (for instance due to settling out of the food dough) and/or permanent marks are made in the casing as a result of mechanical load, such as loads by transport means (belt marks) in particular. Conversely, it is essential to keep the casing and the food dough of the sausage strand sufficiently deformable up to the moment of subdivision such that during subdivision the sausage strand is still sufficiently deformable to allow subdivision of the sausage strand into sausage products in which the casing continues to at least substantially completely enclose the food dough. Subdivision is understood to mean separation into sausage segments (sausage product), for instance by dividing the sausage strand into individual, i.e. mutually separated, sausage products or by dividing the sausage strand into mutually connected sausage products (also referred to as twisted sausages or sausage links). In order to prevent still fragile sausage being damaged or deforming in the short time after coextrusion during the processing steps following co-extrusion, wherein the casing and/or the food dough are exposed to various mechanical and thermal loads, the sausage is carried through an ion-providing fixing bath prior to heating. A first firming of the casing hereby takes place before it is subjected to heavier mechanical loads. An additional problem is that the stability of the casing of the sausage products decreases over time as a consequence of rehydration. Rehydration is the result of a reaction between the food dough and the casing. The effect of rehydration is that the casing gradually disintegrates over time, with the consequence that it becomes less stable in the course of time (for instance as a result of moisture absorption and/or the removal of crosslinker). The increasing cohesion of the sausage is understood to mean an increased firmness of the sausage or an increasing form-retention, irrespective of the form of the sausage at that moment; the term "sausage" includes in this application both the sausage strand and the divided sausage products.

Also from EP 1 834 525 a co-extrusion process for producing a meat product is known comprising the steps of: providing a food dough; providing a viscous paste; producing by means of co-extrusion a sausage strand with a core of food dough enclosed by a casing of the paste; subdividing the sausage strand into sausage products; and guiding the sausage strand through a fixing bath, whereby the cohesion of the sausage increases.

SUMMARY OF THE INVENTION

The present invention has for its object to provide an improved method for manufacturing sausage products, such as for instance, though not exclusively, "Bratwurst", Weisswurst", frankfurters, hot dogs and fresh sausage, of the type stated in the preamble with which, while retaining the advantages of the prior art, co-extruded sausages can be manufactured more rapidly and wherein there is less danger of deformation of or damage to the sausages than in the prior art. An associated purpose is to enable the processing of alternative starting materials which have not been processable heretofore by means of co-extrusion, for instance because of their lack of sufficient form-retention.

The insight according to the present invention is that firmness must be imparted to the co-extruded product more rapidly than in the prior art. The present invention provides for this purpose a method according claim 1 with which this desired result can be obtained.

The insight according to the present invention that firmness must be imparted to the co-extruded product in more rapid manner relative to the prior art can also be applied by a method of the type stated in the preamble, wherein within 50 seconds, preferably within 30 or within 10 seconds following co-extrusion as according to processing step C), at least the outer side of the sausage is heated with a liquid-containing medium to at least the initial temperature (Tc1) of the coagulation range (Tc1-Tc2) of the paste or the food dough. The values of this coagulation range depend on the materials used. The coagulation ranges of for instance organic material, cheese and meat products are therefore different. It is desirable to heat the sausage to at least 40° C., since the coagulation of proteins occurs from this temperature. The sausage can acquire a greater firmness due to the coagulation of the casing and/or the coagulation of a part of the meat dough located at the periphery. It is expressly pointed out here that the meat dough is not fully coagulated in the first instance: a sufficient firmness can already be obtained by coagulating the periphery of the meat dough or the coagulation of (a part of) the casing to enable further processing (such as particularly the manipulation of the sausage).

During the coagulation (larger) molecules lose their spatial structure and cross-link, whereby they acquire a new, more form-retaining structure (compare the boiling of an egg, as a result of which the egg solidifies), and by now making use of this at an early stage in the production process of sausages a greater firmness can be imparted relatively quickly to the sausage strand, with a core of the food dough enclosed by a casing of the paste. Once again the paste remains readily processable (e.g. extrudable) as a result of this measure, and use can be made of the same starting materials. On the other hand, a more rapidly increasing firmness (and this applies for both of the proposed methods, which can otherwise also be performed extremely well in combination) provides the option of processing less firm starting materials. Not only does this increase the possibilities of applying alternative recipes (it thus increases product variation options), use can also be made as desired of less expensive starting materials. Food dough with a lesser firmness is thus generally cheaper. The denaturation temperatures depend on the composition of the paste and the food dough.

There are multiple options for rapid heating of the sausage strand or sausages. It can be advantageous to heat the sausage product in the fixing bath, which is heated for this purpose, or in another liquid bath. Heating is also possible in a moist environment, more particularly in a gas flow saturated to at least 80% with liquid. This can be achieved by, among other methods, adjusting pressure and temperature until this condition is satisfied. Another advantageous option is to heat the sausage by means of steam. The presence of such liquid-containing media during heating make it possible to create a relatively high heating capacity without the medium acquiring too high a temperature (this being undesirable because it can result in damage). The high heating capacity of the medium has the advantage that the heating can take place relatively rapidly compared for instance to air heating; and a more rapid heating is precisely what best provides the advantage sought. The condition of a moist environment can for instance be obtained in a so-called steam cooker, which provides the option of controlling the degree of humidity up to saturation (i.e. a degree of humidity of 100%), by a water bath, a hot-air oven which—in order to satisfy the set requirements—must be adapted to control the degree of humility. An additional advantage of heating in a moist environment is that drying of the sausage product is prevented.

In order to shorten the sausage production process as much as possible and to increase the quality of the sausage, it is advantageous if the sausage strand is heated with a liquid-containing medium within 20 seconds of co-extrusion according to processing step C). This is economically advantageous, among other reasons because the overall processing time, and therefore also the length of a required device, hereby remains limited. Depending on the process conditions, it is likewise advantageous if the sausage strand is already heated before beginning the subdivision of the sausage strand into sausage products as according to processing step E). The point of departure is the attempt to find the quickest possible firming of the sausage strand/sausage products. The process conditions, however, represent a significant limitation here.

There are thus many variations in the starting materials and process conditions (type of paste, type of food dough, paste optionally provided with structure improver, variations in fixing agent, temperature variation, diameter of the sausage strand, other dimensions of the sausage, ambient conditions, process steps required) which also determine when and in which way and to what temperature the sausage can be heated. A number of examples are shown in table form below.

The sausage products resulting from the above stated method need not be pasteurized; it is readily possible to pasteurize the sausage products during for instance a later processing step. It is also noted that the method according to the invention makes it unnecessary for: the sausage products to be boiled, to be subjected to a dewatering step or to be subjected to a drying step. This results in a significant saving in processing time and investment in "hardware".

An advantageous method of heating takes place in a heating bath. In order to improve the storage life of the sausage strand it is attractive for the temperature of the fixing bath to be higher than 40° C. This is because at such a temperature the denaturation of (meat) proteins begins. The heating bath preferably has a temperature between 48° C. and 85° C. What is important in the context of the present invention is that the sausages are in any case not boiled. That is, the ambient temperature must at all times, and therefore particularly also (though not exclusively) in the heating bath, remain lower than 100° C.

It is additionally also possible for a cooling step to take place after the heating, which cooling step can for instance consist of cooling in a cooling bath. In order to increase storage life it is advantageous if, shortly after the heating process, the temperature of the sausage is reduced to for instance a temperature lower than 7° C. When the sausage strand is brought after the fixing bath into contact with an ion-providing liquid, it is attractive if the function of bringing the sausage strand into contact with the ion-providing liquid is combined with that of cooling the sausage strand. A specific embodiment therefore provides the measure that the cooling bath comprises positive divalent and/or trivalent ions. In the context of bringing the sausages into contact with positive divalent and/or trivalent ions it is possible to opt to realize this in simple manner by providing the heating bath and/or the cooling bath with a solution of a calcium salt or an iron salt. In a preferred variant the calcium salt is formed by calcium chloride ($CaCl_2$). It has been found that calcium chloride produces optimum results. Good results can also be obtained when the calcium salt is formed by a calcium acetate or calcium lactate. The paste can comprise a polysaccharide, advantageously formed by alginate.

Experience has shown that it is of further advantage if the ion-providing fixing bath is formed by a solution of calcium chloride at a concentration between 0.1% by weight and 20% by weight. The flavour is not affected here, or only to a slight extent. Even better results are obtained when the concentration of the calcium chloride lies between 0.5 and 10% by weight.

The results in respect of the contact time between the ions, particularly at the above stated concentrations, are optimized when the residence time in the fixing bath lies between 0.1 and 240 seconds.

Yet another embodiment of the method according to the present invention provides the measure that the food dough is composed such that the egress of water is limited. This measure prevents water egressing the meat into the casing as a result of water transport during cutting and during the start of the heating process, and there breaking reversible bonds between the alginate.

A specific preferred embodiment of the method provides the measure that the polysaccharide is formed by alginate, more particularly by sodium alginate, which is converted into calcium alginate in the fixing bath and/or heating bath and/or cooling bath. Although the above elucidated measures are based on the application of a polysaccharide in the casing of the sausage product, it is not precluded that the casing of the sausage product comprises, in addition to the polysaccharide, other coagulating constituents, such as a protein, in particular collagen.

A further solution has been found in adding a structure improver to the viscous paste during the co-extrusion. The viscous paste can hereby still be manufactured, stored and supplied in the usual manner but, shortly before or at the moment that the paste is extruded to form casing round the core of food dough, an additive is added to the paste. The structure improver can comprise a chemically acting structure improver, such as for instance a cross-linker in the form of carbonyl compounds (such as aldehyde) and/or ions, such as calcium, which bring about fixing. Alternatively, a water absorber can also be applied which will generally consist of proteins and/or carbohydrates (hydrocolloids). With the addition of such a chemically acting structure improver the chemical process of firming the casing will already begin shortly before or during the extrusion. The chemical firming process is thus brought forward as far as possible in time without this resulting in a reduced processability of the paste such that the coextrusion and the result thereof are adversely affected thereby. It is otherwise noted here that the intrinsic time at which the action of the structure improver begins can even be shorter than the period of supply of the chemically acting structure improver if this takes place before initiating of the co-extrusion process, particularly when the chemically acting structure improver is already dissolved in water prior to addition.

Alternatively or additionally, it is also possible for the structure improver to comprise a mechanically acting structure improver, such as an additional fibre material or other filler, more particularly a structure improver such as for instance a protein, a carbohydrate and/or salts such as cellulose, pectin and collagen. A firming of the paste is in this way realized relative to the prior art, but then in mechanical manner. It is also important here that the paste must remain readily processable (e.g. extrudable).

Both types of structure improver to be added to the paste during or shortly before coextrusion thus have the result that the overall production time required for the production of sausages according to the present invention can be shortened, and that a device adapted for such production can also be given a more compact form. The production of sausages can hereby take place more cheaply, and the efficiency of the sausage production will increase.

It is desirable for both the stated and optionally alternative structure improvers that the viscosity of the paste during co-extrusion lies between 5 and 1250 Newton, preferably between 10 and 1000 Newton. It is precisely within the part of this viscosity range which differs from the usual viscosity of 5-500 Newton according to the prior art, i.e. the range of 500-1250 Newton, more preferably the range of 500-1000 Newton, that it is still found possible to obtain a good extrusion result without the danger of blockage or fouling of the co-extrusion device.

The supply of the structure improver to the viscous paste "during co-extrusion" can be better specified in that it can be understood to mean that the structure improver is added to the viscous paste for a maximum period of time before co-extrusion such that the cohesion of the casing amounts at the moment of co-extrusion to less than 50%, preferably less than 25%, of the cohesion of the casing of the finished sausage product. It is possible here to envisage for instance a period prior to extrusion of a maximum of 20 seconds, preferably a maximum of 5 seconds, more preferably a maximum of 2 seconds, before the sausage strand is actually co-extruded (for instance the moment at which the sausage strand leaves the extrusion head), that the structure improver is added to the viscous paste. "During co-extrusion" can also be understood to mean that the structure improver is mixed with the viscous paste at the location of or at least a very short distance (less than one metre) from the co-extrusion device (co-extrusion head). The invention must also be interpreted such that "food dough" refers to a meat dough (meat filling) or to other food doughs which can be processed into sausage. It is possible here to envisage for instance a vegetarian food dough made up only of organic material, or a food dough on the basis of cheese or other ingredients. The firmness of the coextruded casing can be determined with a so-called puncture test in which the firmness is expressed in Newton. The casing firmness in the case of co-extrusion according to the present methods is 0.1-15 N, preferably between 0.15 N and 10 N. The thickness of the casing lies typically between 0.1 and 1.1 mm, preferably between 0.02 and 0.5 mm.

Examples of materials for the paste and the structure improver are: proteins such as collagen, gluten and soya; carbohydrates, hydrocolloids (pectins, alginates and carrageenans); cross-linkers; and pH-modifying salts which buffer a pH between 2 and 14).

BRIEF DESCRIPTION OF THE DRAWINGS

The invention will be further elucidated on the basis of the non-limitative exemplary embodiments shown in the following figures. Herein.

DETAILED DESCRIPTION OF THE PREFERRED EMBODIMENTS

Figure 1:
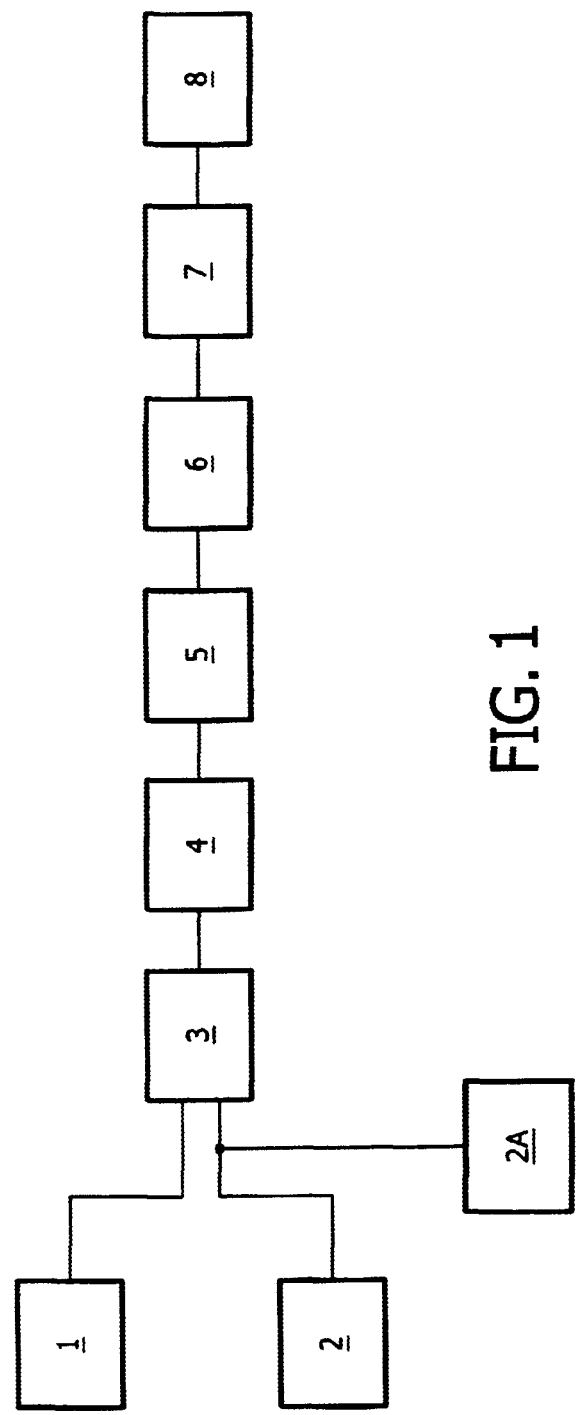
FIG. 1 shows a block diagram representing schematically the method according to the invention.

FIG. 1 shows that the method according to the invention begins with the transport, designated "1", of a food dough to a co-extrusion head. A paste is likewise transported to the co-extrusion head, this being designated "2". This paste comprises for instance a polysaccharide which has to be formed into a casing during the subsequent co-extrusion process 3. Before co-extrusion process 3 begins (or during co-extrusion process 3) a structure improver 2A is fed to paste 2. Co-extrusion of the food dough with the paste casing supplied in step 2 takes place during co-extrusion process 3. Co-extrusion process 3 is per se known. Not known is that according to one of the methods according to the invention a structure improver is added to the viscous paste during co-extrusion process 3.

In step 4 the sausage strand obtained with co-extrusion process 3 is then carried through a fixing bath, this fixing bath comprising for instance a calcium salt such as a calcium chloride. As alternative to the fixing bath, the sausage strand can be sprayed with for instance liquid comprising calcium ions. The calcium ions present in the liquid form bonds with the polysaccharide particles present in the casing. A reversible bond is herein made.

In step 5 the sausage strand meanwhile removed from the fixing bath is cut (divided) such that individual sausages are created.

During the subsequent step 6 the sausages are heated in a moist environment in order to cook them. It is precisely this moist environment (i.e. an environment with an air humidity of at least 70 or 80%) which results in there being no, or only very limited rehydration during this phase of the production process. According to an embodiment variant of the invention, it is even possible for heating 6 to take place in a liquid containing calcium ions so that the connecting process initiated during gelling 4 is continued during heating 6. There then follows an optional further process 7, and in step 8 the sausages are packed.

Figure 2:
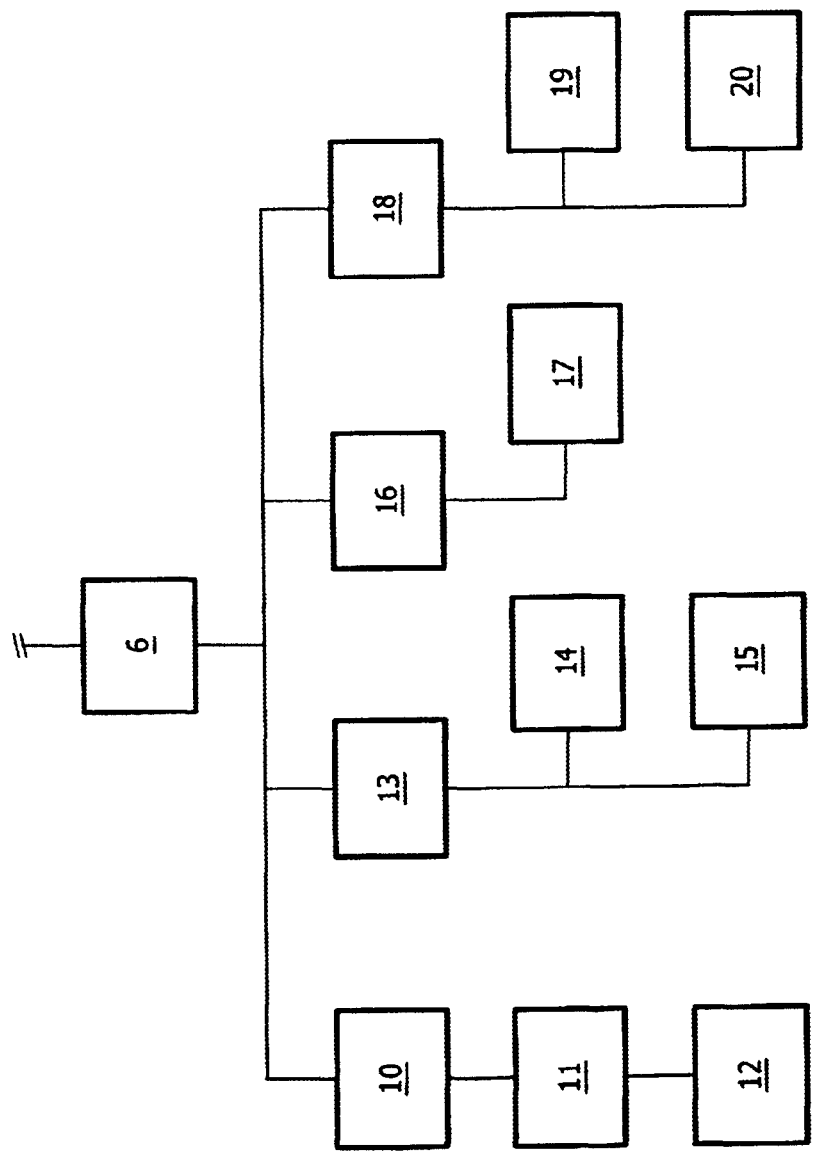
FIG. 2 shows a block diagram representing a number of alternative further processes of the method according to the invention.

FIG. 2 shows a block diagram in which a number of further processes are shown which in FIG. 1 are designated generally with reference numeral 7. A first possible further process 10 thus consists of cooling the sausages to a temperature of about 25° C. (±5° C.). After such a (limited) cooling 10, the sausages can be vacuum-packed 11 and then pasteurized 12 (for instance by means of the so-called cook-in-pack process). The advantage of only limited cooling of the sausages is that this is advantageous in terms of energy since, after cooling, the sausages are heated again (although in packed state).

An alternative further process for the limited cooling 10 is formed by further cooling 13 of the sausages to a temperature of 5° C. (±5° C.). It is less obvious to reheat the sausages after this further cooling 13. Two advantageous further processes following further cooling 13 are vacuum-packing 14 and gas-packing 15 (i.e. packing under a conditioned atmosphere). It is desirable to cool 10, 13 the sausages quickly in order to increase the storage life. It is otherwise also possible here for the sausage products to also be brought into contact during cooling 10, 13 with a solution providing calcium ions.

Another alternative further process is formed by (deep-) freezing 16 of the sausages, after which they are packed 17. It will be apparent that, from the viewpoint of increasing the storage life of the sausages, this is a very advantageous variant.

The final further processing variant shown schematically here is formed by sterilization 18 followed for instance by packing in glass 19 or packing in cans 20.

The following table 1 shows a number of possible variations in the composition and geometry which can occur in the case of different types of sausage which can be manufactured with a method according to the present invention:

TABLE 1

|  | Fresh sausage | Frying sausage | Frankfurter | Ring sausage |
|---|---|---|---|---|
| Meat materials | * | * | * | * |
| Water | * | * | * | * |
| Salts | * | * | * | * |
| Spices | * | * | * | * |
| Binders | * | * | * | * |
| Mincing/mixing | * | * |  | * |
| Emulsifying |  | * | * | * |
| Diameter | 18-36 mm | 18-30 mm | 13-32 mm | 22-40 mm |
| Length | 50-550 mm | 50-550 mm | 20-250 mm | 100-500 mm |
| Weight | 15-560 gram | 12.5-390 gram | 2.5-200 gram | 38-630 gram |

The following table 2 shows a number of possible variations in the composition and geometry which can occur in the case of different types of paste which can be employed in the manufacture of sausages using the method according to the present invention.

TABLE 2

| after addition of structure improver | | | |
|---|---|---|---|
|  | Alginate paste % | Collagen paste % | Alginate/collagen paste % |
| Carbohydrates (hydrocolloids, starches, sugars etc.) | 0-10 | 0-5 | 0-10 |
| Protein (proteins, amino acids etc.) | 0.1-10 | 0.5-20 | 0.5-20 |
| Added acid (pH reducers) | 0-2.5 | 0-5 | 0-5 |
| Fat (oils and fats) | 0-10 | 0-10 | 0-10 |
| Dry substance | 0-35 | 0-42.5 | 0-47.5 |
| Salts/minerals (phosphates, salts, calcium etc.) | 0-2.5 | 0-2.5 | 0-2.5 |

It will be apparent that numerous variations can be made in the above elucidated embodiments without departing from the invention.

What is claimed is:

1. A method for manufacturing sausage products by means of co-extrusion, wherein the method comprises the following steps:
   providing a food dough;
   providing a viscous paste;
   co-extruding the food dough and the viscous paste into a co-extruded product with a core of the food dough enclosed by a casing formed by the viscous paste;
   guiding the co-extruded product through a fixing bath of an ion-containing liquid wherein cohesion of the co-extruded product increases;
   wherein within 20 seconds following the step of co-extrusion of the co-extruded product, the co-extruded product is heated with the ion-containing liquid of the fixing bath, the ion-containing liquid of the fixing bath having a temperature range of at least 48° C. and lower than 85° C.;
   wherein a residence time of the co-extruded product in the fixing bath is greater than 0.1 and less than 240 seconds;
   subdividing the co-extruded product into sausage products;
   cooking the sausage products in a heating bath; and
   wherein, after the co-extruded product is heated with the ion-containing liquid of the fixing bath, the method further comprises cooling the co-extruded product in an ion-containing liquid of a cooling bath to a temperature of 7° C. or lower.

2. The method of claim 1, further comprising the step of pasteurizing the sausage products.

3. The method of claim 1, wherein the co-extruded product is only in the fixing bath to the extent that the food dough is not fully coagulated, or the casing is only partly coagulated.

4. The method of claim 1, wherein the co-extruded product is only in the fixing bath to the extent that only a periphery of the food dough is coagulated in comparison to a remainder of the core of the food dough.

5. The method of claim 1, wherein the ion-containing liquid of the fixing bath is formed from a solution of calcium chloride at a concentration between 0.5% by weight to 10% by weight.

6. A method for manufacturing sausage products by means of co-extrusion, wherein the method comprises the following steps:
   providing a food dough;
   providing a viscous paste;
   co-extruding the food dough and the viscous paste into a co-extruded product with a core of the food dough enclosed by a casing formed by the viscous paste;

guiding the co-extruded product through a fixing bath of an ion-containing liquid wherein cohesion of the co-extruded product increases;
  wherein guiding of the co-extruded product through the fixing bath is performed within 20 seconds following the step of co-extrusion of the co-extruded product, wherein the co-extruded product is heated by the fixing bath to a temperature range of at least 48° C. and lower than 85° C.;
  wherein a residence time of the co-extruded product in the fixing bath is greater than 0.1 and less than 240 seconds;
  wherein the co-extruded product is only in the fixing bath to the extent that only a periphery of the food dough is coagulated in comparison to a remainder of the core of the food dough;
subdividing the co-extruded product into sausage products, the co-extruded product being subdivided into the sausage products after the step of guiding the co-extruded product through the fixing bath;
cooking the sausage products in a heating bath;
wherein the method further comprises guiding the co-extruded product to a cooling bath of an ion-containing liquid such that the co-extruded product is cooled to a temperature of 7° C. or lower.

7. The method of claim 6, wherein the temperature range of the heating bath is lower than 100° C.

8. The method of claim 6, wherein the step of cooling the sausage products occurs while the sausage products are in the fixing bath containing the ion-containing liquid.

9. The method of claim 8, wherein the ion-containing liquid of the fixing bath is formed from a solution of calcium chloride at a concentration between 0.5% by weight to 10% by weight.

10. A method for manufacturing sausage products by means of co-extrusion, wherein the method comprises the following steps:
  providing a food dough;
  providing a viscous paste;
  adding at least one structure improver to the viscous paste such that the viscous paste has a viscosity of about 500-1250 Newton;
  co-extruding the food dough and the viscous paste into a co-extruded product with a core of the food dough enclosed by a casing formed by the viscous paste, the at least one structure improver is added to the viscous paste a maximum of 20 seconds prior to the step of co-extruding the food dough and the viscous paste;
  guiding the co-extruded product through a fixing bath of an ion-containing liquid wherein cohesion of the co-extruded product increases;
    wherein guiding of the co-extruded product through the fixing bath is performed within 10 to 30 seconds following the step of co-extrusion of the co-extruded product, wherein the co-extruded product is heated with the ion-containing liquid of the fixing bath such that the co-extruded product is firmed, the fixing bath having a temperature range of at least 48° C. and lower than 85° C.;
    wherein a residence time of the co-extruded product in the fixing bath is greater than 0.1 and less than 240 seconds;
    wherein the co-extruded product is only in the fixing bath to the extent that only a periphery of the food dough is coagulated in comparison to a remainder of the core of the food dough;
  subdividing the co-extruded product into sausage products, the co-extruded product being subdivided into the sausage products after the step of guiding the co-extruded product through the fixing bath;
  cooking the sausage products;
  wherein the method further comprises guiding the co-extruded product to a cooling bath of an ion-containing liquid such that the co-extruded product is cooled to a temperature of 7° C. or lower.

11. The method according to claim 10, wherein the step of cooking the sausages utilizes a heating bath of an ion-containing liquid.

12. The method according to claim 10, wherein the step of cooking the sausages utilizes a moist environment comprising an air humidity of at least 70%.

13. The method according to claim 1, wherein the co-extruded product is in the fixing bath to the extent that at least the casing reaches at least 40° C.

14. The method according to claim 1, wherein, after cooking the sausage products in the heating bath, the method further comprises cooling the sausage products to a temperature of 0° C. to 10° C.

15. The method according to claim 1, wherein, after cooking the sausage products in the heating bath, the method further comprises cooling the sausage products in an ion-containing liquid of a subsequent cooling bath to a temperature of 0° C. to 10° C.

16. The method according to claim 1, wherein, after cooking the sausage products in the heating bath, the method further comprises cooling the sausage products to a temperature of 20° C. to 30° C.

17. The method according to claim 1, wherein, after cooking the sausage products in the heating bath, the method further comprises cooling the sausage products in an ion-containing liquid of a subsequent cooling bath to a temperature of 20° C. to 30° C.

18. A method for manufacturing sausage products by means of co-extrusion, wherein the method comprises the following steps:
  providing a food dough;
  providing a viscous paste;
  co-extruding the food dough and the viscous paste into a co-extruded product with a core of the food dough enclosed by a casing formed by the viscous paste;
  guiding the co-extruded product through a fixing bath of an ion-containing liquid wherein cohesion of the co-extruded product increases;
    wherein within 20 seconds following the step of co-extrusion of the co-extruded product, the co-extruded product is heated with the ion-containing liquid of the fixing bath, the ion-containing liquid of the fixing bath having a temperature range of at least 48° C. and lower than 85° C.;
    wherein a residence time of the co-extruded product in the fixing bath is greater than 0.1 and less than 240 seconds;
  subdividing the co-extruded product into sausage products;
  cooking the sausage products in a heating bath; and
  wherein, after cooking the sausage products, the method further comprises cooling the sausage products in a cooling bath to a temperature of 10° C. or lower.

* * * * *